United States Patent Office 3,498,865
Patented Mar. 3, 1970

3,498,865
METHOD OF COATING PAPER
Leon J. Paquin, Glens Falls, N.Y., Owen D. Mosher, Bokeelia, Fla., and Glenn M. Violette, Greenwich, N.Y., assignors to International Paper Company, New York, N.Y., a corporation of New York
Continuation-in-part of application Ser. No. 373,993, June 4, 1964, which in turn is a continuation-in-part of application Ser. No. 183,304, Mar. 28, 1962. This application Mar. 27, 1967, Ser. No. 626,031
Int. Cl. B29c 1/00
U.S. Cl. 156—244     13 Claims

ABSTRACT OF THE DISCLOSURE

In the coating of a paper or other fiber web with polyethylene or the like, the plastic is hot extruded into a sheet, brought into contact with the web and bonded to it. One way of bonding is to use an electric charging means at the bonding zone, to charge the plastic and force it against the paper, which in turn rides on a conductive backing bar. The backing bar is shorter than the width of the paper web to avoid bonding beyond the edge of the paper. When the coated web leaves the bonded zone it passes over a directing roll which is also intended to start a gradual cooling of the coating and the web. In order to prevent the still hot plastic from sticking to the roll, said roll is coated with a tetrafluoroethylene, e.g., the product sold by du Pont under the trademark Teflon. This roller is heated sufficiently to only cool the coated web slightly.

Cross reference

Figure 1:
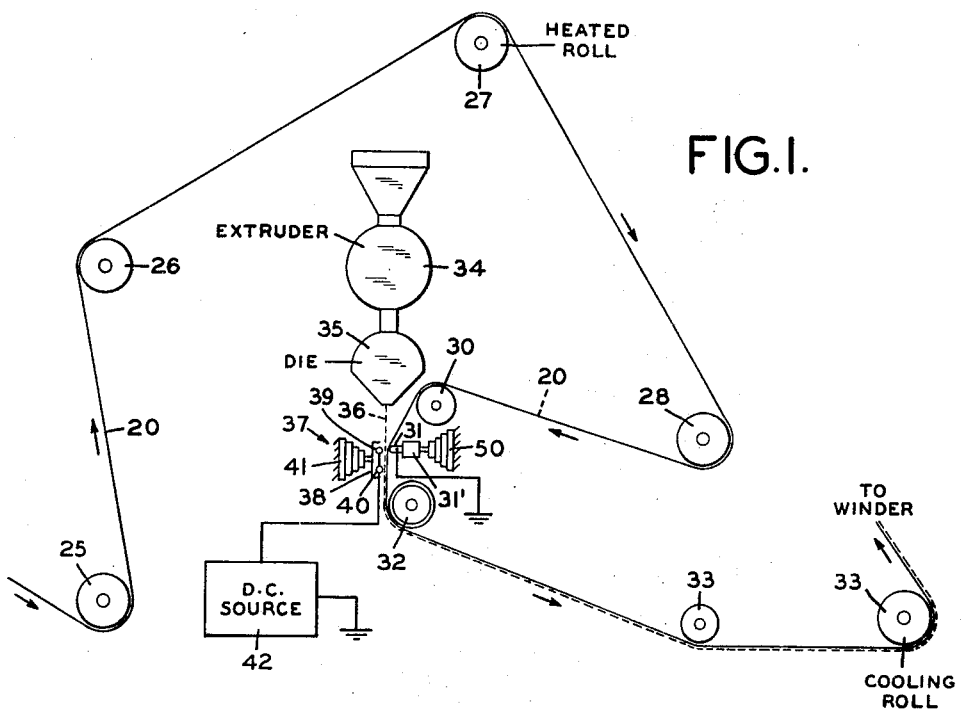

This is a continuation-in-part of copending patent application Ser. No. 373,993, filed June 4, 1964, now Patent No. 3,448,000, which, in turn, was a continuation-in-part of application Ser. No. 183,304, filed Mar. 28, 1962, now Patent No. 3,196,063, granted July 20, 1965.

Background of the invention

This invention relates to improvements in a method of producing a coated paper or like fiber web and more particularly, to a method of producing a polyolefin coated web having improved barrier properties including greater resistance to the passage of gases such as water vapors and solvents such as fats and oils.

In recent years paper coated with polymers and copolymers of the lower olefins have been widely used in the packaging of products, including both solids and liquids. Polyethylene has been the most widely used material for this purpose, and the invention will be described primarily in connection with polyethylene. However, the principles of the invention are applicable generally to the polymers and copolymers of the lower olefins, e.g., propylene, ethylene and butylene, which may be extruded in molten form and deposited on a moving paper web. The term "lower olefins" as used herein is intended to mean the polymers and copolymers of propylene, ethylene and butylene. The principles of the invention can also be applied in coating paper or the like with certain other plastics. Pure crystal polystyrene and high impact polystyrene have been used satisfactorily in the method of the invention. The principles of the invention are also applicable to substrate materials other than paper which have dielectric constants similar to paper.

The coating of a polyolefin, such as polyethylene, upon paper is usually accomplished by passing the extruded polyethylene film and the paper simultaneously between two pressure rolls and thereby bonding the hot film thoroughly to the paper. One of the pressure rolls is usually rubber-covered and is shielded by the paper web. The other of the pressure rolls is conventionally metal-covered, e.g., chrome-plated, and serves to secure the release of the hot extruded polyethylene film. In this regard, it has been found that the use, on the premise that its excellent release properties are well known, of a hot pressure roll having a silicone rubber covering in place of the high cooling capacity chrome-plating does not successfully prevent the sticking of the hot extruded polyethylene to such pressure roll and the resultant production-halting breaking of the paper web. It has also been found that, even at relatively low speeds, the polyethylene film that forms the paper coating must be chilled from extruding temperatures of from about 260° to 315° C. to near room temperatures by the chrome-plated roll in a fraction of a second in order to release therefrom. It appears, therefore, that shock cooling has been considered a requisite of the successful coating of paper with polyolefins.

A brief analysis of the nature of polyolefins, using polyethylene as a typical example, is necessary to a proper understanding of the problem. Polyethylene molecules are either linear or side-chained and compositions containing them are readily identifiable by their molecular weights, molecular weight distributions, densities, percentages of chain branchings, and melt indices. Polyethylenes made by low temperature, low pressure catalytic processes tend to contain higher percentages of linear molecules and, because such molecules lend themselves to the growth of compact, dense crystals as the polymers cool and solidify, they are known as linear or high density polyethylenes. Linear polyethylenes are from about 90% to 95% crystalline in structure with an amorphous remainder. Polyethylenes made by high pressure, high temperature processes tend to contain higher percentages of side-chained molecules and, because such molecules do not lend themselves to the growth of crystals as the polymers cool and solidify, they are only from about 60% to 70% crystalline with an amorphous remainder. The linearity of the molecules then is a factor in the crystallinity and the density of the solids they compose. It is not, however, the sole factor, so that, if it were possible to produce purely linear polyethylene with no molecules having side chains, it would be conceivable that the polymer would pass from being 100% amorphous when melted to being 100% crystalline and having a maximum density of 1.0 when cooled to a solid form. The thermal history of a polyethylene is also relevant and, if such thermal history is unfavourable to the growth of crystals therein, the solid will have a diminished crystallinity and density. It is typical, for instance, for a polyethylene having a high density in the range of 0.945 to 0.950, when supplied, to lose such density appreciably, i.e., down to 0.930 to 0.938, when coated on paper by customary extrusion methods. Polyethylenes of medium density (0.925 to 0.940) and of low density (0.918 to 0.925) show similar, if less dramatic, losses. Hence, it is on account of at least these two factors that all commercially available grades of solid polyethylenes are partly crystalline, partly amorphous mixtures having a density less than 1.0. Densities (other than for paper) set forth herein should be understood to be in grams per cubic centimeter.

Practical consequences flow from the mixed character of solid polymers and copolymers of olefins. Where, for instance, a solid polyethylene has a high amorphous content, it has superior gloss, transparency, and elongation properties. Such properties are desirable in free films, but they have little or no value in captive films, e.g., paper coatings. As paper coatings, polyolefinic films have value almost only when they have good barrier properties, i.e., resistance to the passage of gases such as water vapor and solvents such as fat and oils, these agents being harmful either to the paper itself or to the products wrapped, covered, or contained thereby or perhaps being desirably prevented from escaping from the packaged goods out through the coated papers. Such barrier properties are, of course, a function of the density of the finished coated papers and therefore of the amount of crystallinity of the films coating the papers.

Short of seeking to produce purely linear polyethylenes capable of being 100% crystalline in the solid state, then the most immediate solution to the problem of improving polyolefinic coating films and their barrier properties must be and has been taken to lie in the direction of affording the films the thermal history most favorable to crystal growth possible and, throughout their production and application, in maintaining, in preventing any decline in, in restoring any decline in, or even in a heightening of the amount of crystallinity in any of the polymers and copolymers with which one can coat paper. More particularly, it has been taken to lie in the direction of ascertaining any bad effects on the thermal history of such coating films of their being shock-chilled to enable their release from the pressure roll bonding them and thereafter overcoming or at least mitigating such effects. So much then for the problem giving rise to and the objects satisfied by the present invention.

It has been found that, in a continuous process of coating paper with a film of a compound selected from the group consisting of polymers and copolymers of lower olefins, the pressure rolls commonly employed to bond the film to paper can be eliminated, thereby reducing equipment purchase and maintenance costs, and that shock chilling to obtain film release from one of the pressure rolls can be eliminated, thereby affording the film a thermal history consonant with either an effort to obtain improved barrier properties for smaller amounts of film raw material or an effort to maintain at or improve to a point approaching the theoretical maximum barrier properties of a given amount of film material.

In the method of our Patent No. 3,196,063, issued July 20, 1965, electrostatic charges are created and used to apply the hot extruded film to the paper. This method has been found to yield results far superior to those of the conventional practices using two pressure rolls, particularly as regards obtaining a high moisture vapor barrier at low coating weights. Another important advantage of the electrostatic method over the conventional practices has been in the case of obtaining a good polyethylene-paper adhesion at low coating weights.

One object of this invention is to improve the quality of paper or other web that is electrostatically coated with plastics such as the polymers and copolymers of the lower olefins.

A more particular object of this invention is to leave a narrow unadhered border of web at each edge to allow over run of plastic without sticking, while at the same time avoiding the necessity of trimming a wide strip to obtain a clean edge.

The foregoing particular object is accomplished by means of a backing electrode bar that is somewhat shorter than the paper width, so that the plastic is not attached to the narrow edge strip and therefore does not adhere to the web. Furthermore, if the extruded film should be wider than the web, it will not be attracted to the ends of the bar which would result in fouling of the mechanism.

Another particular object of the invention is to avoid abrupt cooling of the plastic and consequent deterioration of its filming properties. This is accomplished by placing a heated directing roll closely adjacent to the bonding zone. This roll is cooler than the plastic but still warm enough to avoid shock cooling thereof. Because the roll is still relatively hot, there may arise the problem of plastic film sticking to it. This is avoided by the use of a suitable coating on this roller.

Short description of the drawing

Figure 2:
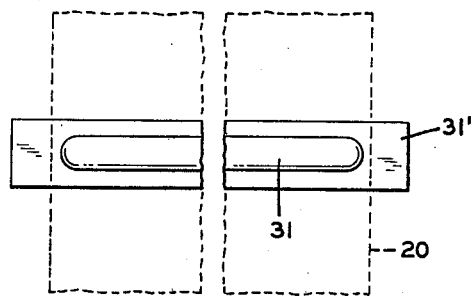
Figure 3:
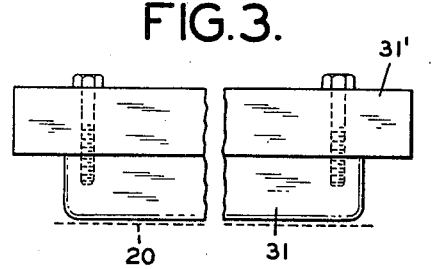
Figure 4:
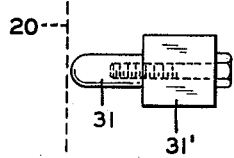

Other and further objects and features of this invention will appear more fully and clearly from the following particular description taken in connection with the appended drawing in which FIG. 1 is a schematic diagram illustrating one form of apparatus for practicing the method of this invention;

FIG. 2 is a front view of the end portions of the backing electrode and the corresponding portions of the web to show that the bar is shorter than the web width; and FIGS. 3 and 4 are respectively a top and an end view of the bar.

Description of preferred embodiment

A web 20 from a suitable supply roll (not shown) passes around a roll 25 and then passes around steam heated rolls 26, 27, and 28, a guide roll 30, an electrically grounded backing bar 31, a directing and preliminary cooling roll 32 and cooling rolls 33. The web leaving the second cooling roll 33 goes on to a winding roll although other treatment zones may be positioned between the cooling roll and the winder. The cooling rolls 33 preferably are driven and the steam-heated rolls may be driven if desired.

An extruder 34 and a die 35 are positioned to extrude a thin film 36 of polyethylene or other plastic downwardly so as to contact a surface of the web 20 as the web is contacting the backing bar 31 right after it leaves the turning roll 30. The roll 30 is located close to the die 35 and in a position to converge the web 20 with the plastic film 36 in the region adjacent to the backing bar 31.

The bar 31 is made from a conductive metal. Aluminum has been found desirable for this purpose. An example of a particular bar 31 would be a half inch thick rectangular aluminum strip having the web contacting edge rounded as shown in FIG. 4 so that the circumferential length of the paper contacting the aluminum surface is from 1/16 inch to 1/8 inch. The length of the bar 31 should be less than the width of the paper web. The backing bar 31 and its mount 31' may be insulated from the surrounding structures as by a mounting insulator 50. The backing bar may be electrically connected to ground, to a positive or negative potential source. As indicated in FIG. 2, the backing bar is of less length than the width of the paper web passing thereover. Advantageously, this may be 1/2" less than the web width divided equally 1/4" on either side. This margin of no paper contact by the bar allows the polyethylene to be extended to the edge of the paper without adhering within this margin. Furthermore, if the plastic overruns the edge of the paper it will not be attracted to the backing bar and fouling up the assembly. The use of a 1/4" margin on each side allows for trimming about 1/2" from each edge to remove the plastic bead in the edge of the extruded sheet. If the backing bar were as long or longer than the paper width, extrusion to the edge or slightly over would cause the above indicated difficulties. It therefore would be necessary to have a relatively wide uncoated strip on either side thus requiring an excessive amount of trim. With the shorter backing bar and the resulting narrower adhering field, the amount of trim is reasonable as indicated.

The mounting of the backing bar 31 should be sufficiently rigid that little or no deflection or movement of the bar will occur under the forces acting thereon. In other words, the bar 31 should afford a rigid backing support for the paper web. However, it is desirable that contact between the paper and the backing bar be limited to a short arc, i.e., the 1/16" to 1/8" long arc described above.

From bar 31 onwardly, the paper web 20 has adhered to one surface thereof a thin film of polyethylene. In accordance with the method of Patent No. 3,196,063, referred to above, and with the method of the present invention, an electric field is used to apply the hot extruded polyethylene film to the paper with sufficient pressure to produce adhesion of the film to the paper.

The electric field is produced between an electrode structure 37 and the backing bar 31. The electrode structure comprises a holder 38 and a pair of wires 39, 40 which are parallel with the bar 31. The top wire 39 preferably is directly opposite, i.e., in horizontal alignment with the area of contact between the polyethylene film and the paper when the paper is traveling at a slow speed. The lower wire 40 preferably is vertically beneath the wire 39 and typically might be spaced about 1" therefrom. The spacing between the plane of the wires 39 and 40 and the vertical plane at the front edge of backing bar 31 may be of the order of ¼" to 2", depending on the film thickness and the applied voltage. The wires 39 and 40 typically might be .006" diameter tungsten wires.

The wire holder 38 should hold the wires 39 and 40 under sufficient tension to resist the substantial pull which will be experienced in the direction of the backing bar 31. The holder 38 is supported by a suitable insulating structure 41. The holder 38 may be electrically connected to wires 39 and 40, or it may be insulated from the wires and be connected to ground as a personnel safety precaution. In either event, the wires 39 and 40 are connected to a source of voltage 42, which may be of any suitable type and preferably provides a voltage of the order of 3,000 to 50,000 volts. The usable voltage for any given structural arrangement is limited by the requirement that arcing or sparking between the electrode wires and the backing bar be avoided. Either the negative or positive potential may be applied to the wires 39 and 40, the other potential being connected either to ground or directly to backing bar 31. An alternating voltage has been used successfully.

The high voltage on the wires 39 and 40 ionizes the air in the immediate vicinity of the wires, and under appropriate conditions this can be observed as a corona discharge in the immediate vicinity of the wires. The corona should be limited to the region of the wires and preferably should not extend to the polyethylene film. It is believed that ions migrate away from the vicinity of the wire and that some of them impinge on the polyethylene, resulting in an attractive electric field between the polyethylene film and the paper.

A substantial proportion of the ions produced in the vicinity of the wires 39 and 40 will tend to travel in directions in which they will not impinge on the polyethylene film or at least not in the region of convergence between the polyethylene film and the paper. Various means can be used to concentrate the ion flow so as to maximize the ion flow into the polyethylene film in the region of convergence thereof with the paper. For example, air flow may be used to direct the ions in the desired direction. Or charged shields may be provided to inhibit ion flow except in the desired direction.

The polyethylene film 36 leaving the die 35 will generally have a temperature of about 600° F., but will cool so as to contact the paper at a temperature in the range of about 450–475° F. The paper web which contacts the polyethylene preferably is heated by the steam rolls to minimize chilling of the polyethylene; typically, the paper temperature might be of the order of 150° F. to 240° F. at the backing roll 31. Infra-red or other heating elements may be used to heat the paper to a suitable temperature. The heating of the paper also promotes adhesion of the polyethylene film to the paper.

As the coated web 20, 36 leaves the backing bar 31 it passes around a closely adjacent roll 32 to direct it toward the winder. It is desirable that the polyethylene start cooling as soon as possible but at a not too rapid rate. Thus if the roll 32 is heated so that its temperature is somewhat lower than the temperature of the coated web, chilling will start but will not proceed too rapidly. The roll 32 should thus be heated, preferably by circulating water at a temperature of the order of 180° F. The temperature of the heating medium, e.g., water, supplied to roll 32 should be selected so that the surface operating temperature on the surface of roll 32 will be in the range of about 260–320° F.

If the polyethylene is extruded at about 600° F. so as to contact the paper at approximately 450–475° F. and the paper is heated by the steam rollers to have a temperature at the backing bar of 150–240° F., the surface operating temperature at the roll 32 will be about 260–320° F. assuming a roll heated by water at 180° F. running therethru.

In order to prevent the adherence of any hot polyethylene that may extend beyond the web or through pin holes, the roll 32 is coated with a releasing material. One suitable material is tetrafluoroethylene, e.g., a product sold by Du Pont under the trademark Teflon.

As mentioned previously, the guide roll 30 should be located closely adjacent the extrusion die 35. Preferably the horizontal axis of the roll 30 is approximately at the same height as the exit lip of die 35.

The backing bar should be located approximately midway between the exit lip of die 35 and the preliminary cooling roll 32. In a typical installation the draw distance, i.e., the vertical distance between extruder die 35 and backing bar 31 might be about four inches. In such case, the axis of rolls 30 and 32 should be spaced apart vertically about eight inches.

As illustrated in FIG. 1, the paper web 20 contacts roll 32. While this is the preferred form of operation since it seems to result in fewer pin holes, the arrangement can be set up so that the polyethylene surface 36, rather than the paper web 20, actually contacts the roll 32. It will be evident that in such case the cooling effect of the roll 32 on the polyethylene will be greater than under the condition illustrated in FIG. 1 in which the paper contacts roll 32.

The moisture vapor transfer resistance of the polyethylene coated paper will tend to be higher when the paper contacts roll 32 than when the polyethylene contacts roll 32 because of the slower polyethylene cooling which occurs in the former. In order to improve the moisture vapor transfer resistance when it is the polyethylene which contacts roll 32, it will usually be desirable to run roll 32 at a somewhat higher temperature than when the roll 32 is contacted by the paper surface.

A variety of electrode structures may be used to create the electric field in the region of convergence of the polyethylene and paper. For example, the various electrode structures of the aforementioned Patent 3,196,063 may be used for this purpose. A detailed illustration of a suitable electrode structure is shown in FIGS. 2 and 3, of application Ser. No. 373,993.

What is claimed is:

1. The continuous process of coating a web of paper or like dielectric material with a film of an extrudable plastic which is subject to the attractive influence of an electric field, comprising the steps of extruding the film, advancing the web through a selected region, directing the extruded film along a path in which the film and the web converge in the region, ionizing the air in this region and thereby subjecting the extruded film in this region to the action of an electric field whereby the film is forced into bonding contact with the web, restricting the width of the region of ionization to slightly less than the width of the web, directing the film-carrying web leaving said region over a preliminary cooling roll heated to a temperature slightly below the film temperature at the time of contacting said roll, and thereafter cooling said film-carrying web to room temperature.

2. The continuous process of coating a paper web with a film of a compound selected from the group consisting of polymers and copolymers of lower olefins comprising the steps of extruding the film, advancing the web through a selected region, directing the extruded film along a path in which the film and the web converge in the region, and ionizing the air in this region thereby subjecting the extruded film in the region to the action of an electric field, whereby the film is forced into bonding contact with the web, characterized by restricting the width of the region of ionization to slightly less than the width of the web.

3. The process set forth in claim 2 in which said ionization is established by means of an electrode structure positioned in said region and including a backing electrode contacted by said web, said backing member being shorter than the width of said web to limit bonding to a central area of said web which contacts said backing electrode and which central area is bordered by narrow strips of unbonded film.

4. The process of continuously coating a paper web with a closely adherent film of a plastic selected from the group consisting of polystyrene and the polymers and copolymers of lower olefins, comprising the steps of passing the web over a backing bar that is slightly shorter than the web width, extruding a film of the plastic into a path such that it converges with said web as the latter passes over said bar, applying a high voltage electric potential between said bar and an adjacent electrode structure to ionize the air in said region of convergence of said film and said web to create a field in said region which adheres the film to the web, and passing the film-carrying web through an additional path in which the combined film and web passes over a roll heated to an elevated temperature lower than the temperature of said film at the time of contact with said roll to effect a preliminary cooling of said film,, and thereafter completing the cooling of said film-carrying web.

5. The process set forth in claim 4 in which said bar is centrally positioned with respect to said web to provide a margin at each side of said web in which film is not adhered to said web.

6. The process set forth in claim 4 in which the length of said path through which said extruded film is directed into contact with said web is approximately equal to the length of said additional path.

7. The process set forth in claim 4 in which said roll is subjected to heating to provide a surface operating temperature in the range of about 260°–320° F.

8. The process set forth in claim 4 in which said roll is coated with a release material to which the heated plastic will not adhere.

9. The process set forth in claim 8 in which said release material is tetrafluoroethylene.

10. The process set forth in claim 4 in which said web passes in direct contact with said roll.

11. The process set forth in claim 4 in which said film passes in direct contact with said roll.

12. The process set forth in claim 4 in which said web is heated prior to entry into said region so that said web has a temperature of the order of 150°–240° F. when contacted by said film.

13. The method of continuously coating a fiber web with a layer of plastic film that comprises heating the web, passing the web over an electrically conductive backing bar of less length than the web width, extruding a plastic film into the space above and adjacent to the bar to converge the film with the web while the web is against the bar, ionizing the atmosphere in the region of convergence to force the film into adherence with the web, passing the coated web over a roll for directing it toward a storage area, maintaining said roll at an elevated temperature somewhat below that of the coated web to initiate slow cooling of the coated web, the roll being coated with a release material to inhibit the adherence of any of the plastic to the roll surface.

References Cited

UNITED STATES PATENTS

| | | | |
|---|---|---|---|
| 3,218,212 | 11/1965 | Underwood | 156—244 |
| 3,323,965 | 6/1967 | Hanle et al. | 156—244 |
| 3,402,086 | 9/1968 | Smith et al. | 156—244 |

FOREIGN PATENTS 728,203  4/1955  Great Britain.

BENJAMIN R. PADGETT, Primary Examiner

H. E. BEHREND, Assistant Examiner

U.S. Cl. X.R.

156—272, 380; 264—22